United States Patent
Ishii et al.

(10) Patent No.: US 9,455,054 B2
(45) Date of Patent: Sep. 27, 2016

(54) RADIOACTIVE CESIUM ADSORBENT, METHOD FOR PRODUCING THE SAME, AND METHOD FOR REMOVING RADIOACTIVE CESIUM IN ENVIRONMENT WITH SAID ADSORBENT

(75) Inventors: Kazuyuki Ishii, Tokyo (JP); Masashi Obi, Tokyo (JP); Kazuaki Kudo, Tokyo (JP); Kengo Akagawa, Tokyo (JP); Tetsu Tatsuma, Tokyo (JP); Akiyoshi Sakoda, Tokyo (JP)

(73) Assignee: The Foundation for the Promotion of Industrial Science, Meguro-Ku (JP)

( * ) Notice: Subject to any disclaimer, the term of this patent is extended or adjusted under 35 U.S.C. 154(b) by 201 days.

(21) Appl. No.: 14/239,736

(22) PCT Filed: Aug. 16, 2012

(86) PCT No.: PCT/JP2012/070844
§ 371 (c)(1),
(2), (4) Date: Feb. 19, 2014

(87) PCT Pub. No.: WO2013/027652
PCT Pub. Date: Feb. 28, 2013

(65) Prior Publication Data
US 2014/0194665 A1 Jul. 10, 2014

(30) Foreign Application Priority Data
Aug. 19, 2011 (JP) .................. 2011-179871

(51) Int. Cl.
*G21F 9/12* (2006.01)
*G21F 9/30* (2006.01)
(Continued)

(52) U.S. Cl.
CPC ............ *G21F 9/301* (2013.01); *B01J 20/0229* (2013.01); *B01J 20/24* (2013.01); *B01J 20/26* (2013.01); *B01J 20/28023* (2013.01); *B01J 20/3078* (2013.01); *B01J 20/3085* (2013.01); *B01J 20/3208* (2013.01); *B01J 20/3236* (2013.01); *G21F 9/12* (2013.01); *G21F 9/302* (2013.01)

(58) Field of Classification Search
None
See application file for complete search history.

(56) References Cited

U.S. PATENT DOCUMENTS

| 4,515,849 A | * | 5/1985 | Keino ................... B44C 1/1712 156/230 |
| 4,720,422 A | | 1/1988 | Higuchi et al. |

(Continued)

FOREIGN PATENT DOCUMENTS

| EP | 0575612 A1 | 12/1993 |
| EP | 2644266 A1 | 10/2013 |

(Continued)

OTHER PUBLICATIONS

International Preliminary Report on Patentability issued in PCT/JP2012/070844 on Feb. 25, 2014 (5 pages).

(Continued)

*Primary Examiner* — Daniel Berns
(74) *Attorney, Agent, or Firm* — Osha Liang LLP

(57) ABSTRACT

The present invention relates to a radioactive cesium adsorbent, a method for producing the same, and a method for decontaminating the environment from radioactive cesium with the adsorbent. The radioactive cesium adsorbent of the present invention includes a hydrophilic fiber substrate supporting a Prussian blue analog, in particular, Prussian blue, and the Prussian blue analog is immobilized in the inside of the fibers.

20 Claims, 2 Drawing Sheets

(51) Int. Cl.
    *B01J 20/26*      (2006.01)
    *B01J 20/24*      (2006.01)
    *B01J 20/02*      (2006.01)
    *B01J 20/22*      (2006.01)
    *B01J 20/28*      (2006.01)
    *B01J 20/30*      (2006.01)
    *B01J 20/32*      (2006.01)

(56) References Cited

U.S. PATENT DOCUMENTS

| | | | |
|---|---|---|---|
| 6,046,131 A * | 4/2000 | Tanihara | B01J 20/103 502/402 |
| 6,558,552 B1 | 5/2003 | Loos-Neskovic et al. | |
| 2004/0178141 A1 | 9/2004 | Vidal-Madjar et al. | |
| 2004/0178385 A1 | 9/2004 | Bispo et al. | |
| 2013/0295197 A1 | 11/2013 | Krieg et al. | |

FOREIGN PATENT DOCUMENTS

| | | |
|---|---|---|
| JP | S63-024415 B2 | 5/1988 |
| JP | S64-033272 A | 2/1989 |
| JP | H04-118596 A | 4/1992 |
| JP | 2810981 B2 | 10/1998 |
| JP | 2005-500158 A | 1/2005 |
| WO | 99/10278 A1 | 3/1999 |

OTHER PUBLICATIONS

"The Great East Japan Earthquake: Contaminated school yard soil replaced on-site today in Fukushima" Mainichi Shimbun; May 8, 2011 (2 pages).
"Radiogardase® Capsule 500mg" Nihon Medi-Physics Co., Ltd., Oct. 2010 (30 pages).
Partial English-language translation of "Radiogardase® Capsule 500mg" Nihon Medi-Physics Co., Ltd., Oct. 2010 (2 pages).
"The Great East Japan Earthquake: Team of Tokyo Institute of Technology developed technique to purify cesium-contaminated water with pigment" Mainichi Shimbun; Apr. 15, 2011 (2 pages).
Extended European Search Report dated Jul. 13, 2015 in corresponding European Patent Application No. 12825414.1 (10 pages).
"Common Chemistry—Substance Details"; Anonymous; Jul. 2, 2015, XP055199738; www.commonchemistry.org (2 pages).
International Search Report issued in PCT/JP2012/070844 mailed on Sep. 18, 2012 (4 pages).

* cited by examiner

RADIOACTIVE CESIUM ADSORBENT, METHOD FOR PRODUCING THE SAME, AND METHOD FOR REMOVING RADIOACTIVE CESIUM IN ENVIRONMENT WITH SAID ADSORBENT

TECHNICAL FIELD

The present invention relates to a radioactive cesium adsorbent, a method for producing the same, and a method for removing radioactive cesium in the environment with the adsorbent. The radioactive cesium adsorbent of the present invention includes a hydrophilic fiber substrate supporting a Prussian blue analogue, the Prussian blue analogue being immobilized in the inside of the fibers.

BACKGROUND ART

The unprecedented accident at the Fukushima Daiichi Nuclear Power Plant following the Great East Japan Earthquake on Mar. 11, 2011 still has had serious impacts on agriculture, fisheries, livestock industry and, above all, the lives of residents living in the vicinity. Japan has been confronted with urgent issues not only in the remediation of the nuclear accident but also in the removal of radioactive substances such as iodine ($^{131}$I), cesium ($^{134}$Cs, $^{137}$Cs) and strontium ($^{90}$Sr) emitted in the environment by the accident. In particular, many institutes have been working on various approaches to the decontamination of the environment (in particular, water and soil) from cesium 137 ($^{137}$Cs) that is the major radioactive substance with a long half-life of about 30 years.

An example of the soil decontamination methods is the physical removal of the surface soil that has been contaminated. However, this method entails problematic treatment of the removed surface soil. Thus, an "on-site replacement method" is recently studied in which the contaminated surface soil is replaced by lower earth (see, for example, Non Patent Literature 1). This method attracts attention because of its freedom from concerns about surface soil treatment and its capability of reducing the radiation dose to $\frac{1}{10}$ or below. However, the fact that the contaminated soil is left in the earth raises concerns about the possibility of future contaminations of soil and water.

On the other hand, chemical decontamination methods of recovering radioactive substances with adsorbents or the like have been considered. Adsorbents based on a hexacyanoferrate (II) salt (ferrocyanide) which is a Prussian blue analogue are known as conventional radioactive cesium removers. Various techniques have been reported in order to recover efficiently radioactive cesium from highly radioactive waste liquid discharged from nuclear facilities, with examples including a method for enhancing the cesium adsorption properties of insoluble ferrocyanides and a method in which copper hexacyanoferrate (II) is supported on a porous resin (see, for example, Patent Literatures 1 and 2). Further, Prussian blue itself (iron (III) hexacyanoferrate (II) hydrate) has been pharmaceutically approved (RADIOGARDASE®) in Japan, Europe and the United States as a safe drug which may be used for emergency exposure to remove radioactive cesium from the body (see, for example, Non Patent Literature 2).

Further development of decontamination techniques has been carried out focusing on and with the application of the cesium-binding ability of Prussian blue analogues. For example, it has been reported in media such as newspaper that Tokyo Institute of Technology, Research Laboratory for Nuclear Reactors, developed a system for decontaminating highly contaminated water with Prussian blue (see, for example, Non Patent Literature 3).

PRIOR ART DOCUMENTS

Patent Literature

Patent Literature 1: Japanese Patent Application Kokai Publication No. H4-118596
Patent Literature 2: Japanese Patent No. 2810981

Non-Patent Literature

Non Patent Literature 1: Mainichi Shimbun, May 8, 2011
Non Patent Literature 2: Pharmaceutical Interview Form, "RADIOGARDASE®capsule 500 mg", Nihon Medi-Physics Co., Ltd., October 2010 (first edition)
Non Patent Literature 3: Mainichi Shimbun, Apr. 15, 2011

DISCLOSURE OF THE INVENTION

Problems to be Solved by the Invention

Because Prussian blue analogues are generally water-insoluble powdery substances, they can be directly added to water to adsorb cesium (and be optionally aggregated and sedimented with agents such as flocculation and sedimentation agents) and be thereafter recovered easily by filtration. Therefore, the Prussian blue analogues have been studied exclusively for the decontamination of highly polluted water. Although the distribution of Prussian blue analogues on soil is probably effective for decontamination, difficulties are encountered in separating and recovering the powdery Prussian blue analogues (to which cesium has been adsorbed) selectively from the soil after the decontamination, possibly causing similar problems as in the physical decontamination incurring the problem of surface soil treatment.

Radioactive substances, even if their amounts are small, cause a problem by emitting radiations. Actually, the accumulated total amount of radioactive cesium ($^{134}$Cs, $^{137}$Cs) emitted to the environment by the last nuclear accident is estimated to reach 1,000,000 Bq/m$^2$ to 30,000,000 Bq/m$^2$ (as of Apr. 29, 2011). Even in the highly polluted areas, the absolute amount of radioactive cesium that is present is only 300 mg/km$^2$ at most. When a small amount of radioactive substance has been diffused and spread over a wide range as is the case in the last accident, the physical decontamination by removing the surface soil has a risk of newly producing large volumes of radioactive wastes. Thus, there has been a demand for a chemical decontamination method which can efficiently recover radioactive cesium from the environment and does not produce a mass of radioactive wastes. It is therefore an object of the present invention to provide a novel cesium adsorbent, a method for producing the same, and a method for removing radioactive cesium in the environment with the cesium adsorbent.

Means to Solve the Problems

To solve the problems, the present inventors first studied the immobilization of Prussian blue analogues on carriers, in particular, hydrophilic fiber carriers which are easy to handle and have excellent formability. However, it has been conventionally difficult to immobilize Prussian blue analogues stably on hydrophilic fiber carriers because the Prussian blue analogues are insoluble in media such as water and organic solvents, for example, as with Prussian blue that is the typical example of such analogues and is an old pigment. The present inventors focused on synthetic raw materials for Prussian blue analogues, and have found that stable immobilization becomes feasible by treating a hydrophilic fiber carrier not with a Prussian blue analogue itself but with synthetic raw materials thereof, namely, sequentially with an inorganic salt of a hexacyano metallic acid and with an inorganic compound containing a transition metal element. The present inventors have found that a Prussian blue analogue (namely, the transition metal salt of the hexacyano metallic acid) is formed in situ in the above manner with the result that fine particles of the insoluble Prussian blue analogue are formed not only on the surface of the fibers but also in the inside of the fibers. The present invention has been completed based on these findings.

Means to solve the problems of the present invention are as follows:

1. A cesium adsorbent including a hydrophilic fiber substrate supporting a Prussian blue analogue, wherein the Prussian blue analogue being immobilized in the inside of the fibers.

2. The cesium adsorbent described in 1, wherein the Prussian blue analogue is Prussian blue.

3. The cesium adsorbent described in 1 or 2, wherein the hydrophilic fiber substrate is a woven, knitted or nonwoven fabric article including hydrophilic fibers, or a paper article.

4. The cesium adsorbent described in any of 1 to 3, wherein the hydrophilic fiber substrate is a woven, knitted or nonwoven fabric article including natural fibers or regenerated cellulose fibers.

5. The cesium adsorbent described in any of 1 to 4, wherein the hydrophilic fiber substrate is a woven, knitted or nonwoven fabric article including cotton, rayon or cupra.

6. A cesium removal device including the cesium adsorbent described in any of 1 to 5.

7. The cesium removal device described in 6, including an activated carbon layer adjacent to the cesium adsorbent.

8. A production method for producing the cesium adsorbent described in 1, including:

(a) a step of treating the hydrophilic fiber substrate with an aqueous solution of an inorganic salt of a hexacyano metallic acid; and (b) a step of treating the substrate treated in the step (a) with an aqueous solution of an inorganic compound containing a transition metal element.

9. The production method described in 8, wherein the inorganic salt of a hexacyano metallic acid in the treatment step (a) is potassium or sodium hexacyanoferrate (II).

10. The production method described in 8 or 9, wherein the inorganic compound containing a transition metal element in the treatment step (b) is an inorganic compound containing iron (III).

11. The production method described in 10, wherein the inorganic compound containing iron (III) is iron (III) chloride, iron (III) nitrate, iron (III) sulfate or iron (III) perchlorate.

12. The production method described in any of 8 to 11, wherein the treatment step (a) includes a step of impregnating the hydrophilic fiber substrate with the aqueous solution of an inorganic salt of a hexacyano metallic acid; and a step of washing the impregnated substrate with water, a polar organic solvent or a mixture thereof.

13. The production method described in any of 8 to 12, wherein the treatment step (b) includes a step of impregnating the substrate treated in the step (a) with the aqueous solution of an inorganic compound containing a transition metal element; and a step of drying the impregnated substrate.

14. A method for removing radioactive cesium from a contaminated object, including a step of bringing the object contaminated with radioactive cesium into contact with the cesium adsorbent described in any of 1 to 5, and a step of recovering the adsorbent.

15. A method for removing radioactive cesium from a contaminated object, including a step of treating the object contaminated with radioactive cesium with the cesium removal device described in 6 or 7, and a step of recovering the cesium adsorbent from the removal device.

Effects of the Invention

Since a Prussian blue analogue, in particular, Prussian blue is a pharmaceutically approved substance as described above, the cesium adsorbent of the present invention having this substance immobilized on the hydrophilic fiber substrate is safe and easy to handle. The adsorbent of the present invention may be obtained from inexpensive and easily available materials by a simple production method, thus realizing excellent applicability to a wide range of environmental purification from an economical aspect. In particular, the excellent formability of the hydrophilic fiber substrate advantageously allows the cesium adsorbent to be readily processed into a configuration best suited for the object to be decontaminated. Further, in the cesium adsorbent of the present invention, the Prussian blue analogue is so securely immobilized to the hydrophilic fiber substrate that the adsorbent may be recovered after the adsorption of radioactive cesium without leaving the Prussian blue analogue (to which cesium has been adsorbed) in the environment. Thus, the amounts of radioactive wastes may be suppressed as compared to the physical decontamination by removing the surface soil.

EMBODIMENTS TO CARRY OUT THE INVENTION

Prussian Blue Analogues

Figure 1:
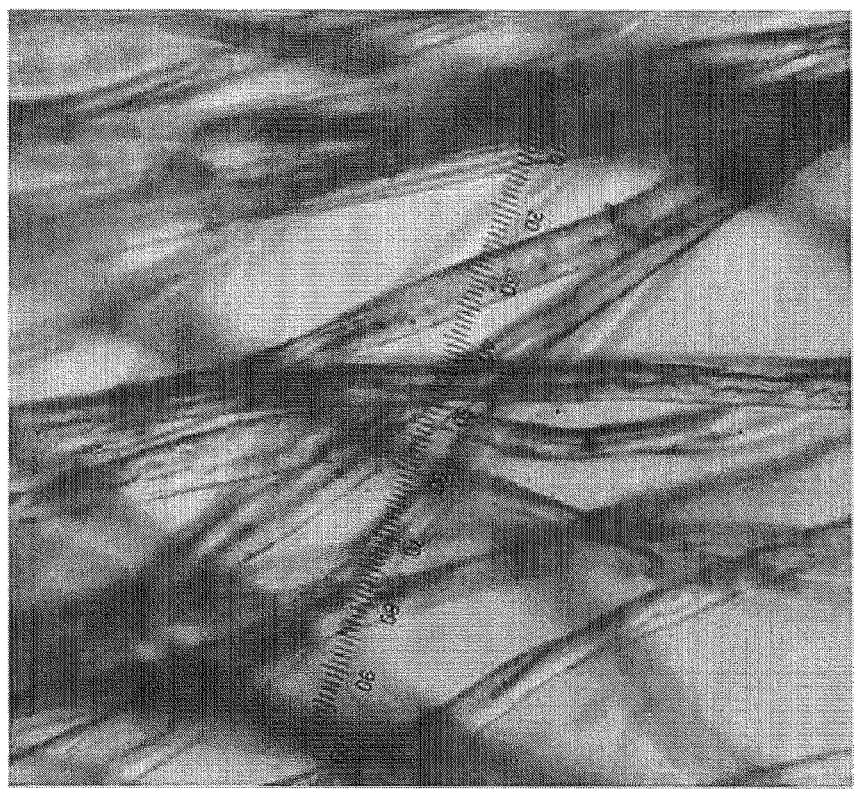
FIG. 1 is a micrograph (×400) of an adsorbent obtained in Fabrication Example 4.
Figure 2:
FIG. 2 is a micrograph (×400) before treatment of a substrate used in Fabrication Example 4.

In the present invention, Prussian blue analogues are understood to refer to a type of cyano-bridged metal complexes having a hexacyano metallic acid ion as a constitutional element, and are understood to be compounds of general formula: $M^A{}_m[M^B(CN)_6]_n \cdot hH_2O$ which have a face-centered cubic structure in which the metal ions ($M^A$ and $M^B$) are bridged alternately via the cyano groups. Here, $M^A$ is a first transition metal. Thus, the Prussian blue analogues in the present invention may be translated to transition metal salts of hexacyano metallic acids. Examples of the first transition metals include scandium (Sc), titanium (Ti), vanadium (V), chromium (Cr), manganese (Mn), iron (Fe), cobalt (Co), nickel (Ni), copper (Cu) and zinc (Zn), with iron (Fe), cobalt (Co), nickel (Ni), copper (Cu) and zinc (Zn) being preferable, and iron (Fe), in particular ferric iron (Fe (III)) being more preferable.

In the above general formula, $M^B$ may be any metal which may have a six-coordinated octahedral structure, and is preferably chromium (Cr), manganese (Mn), iron (Fe) or cobalt (Co), and more preferably iron (Fe), in particular ferrous iron (Fe (II)). In the above general formula, the values of m, n and h are determined in accordance with the oxidation numbers of $M^A$ and $M^B$.

The Prussian blue analogues (namely, the transition metal salts of hexacyano metallic acids) in the present invention are not limited as long as the compounds are obtained by the reaction between an inorganic salt of a hexacyano metallic acid and an inorganic compound containing a transition metal element and as long as the compounds include the compounds of the above general formula. In the Prussian blue analogues of the present invention, part of the metal ions in the transition metal salts of hexacyano metallic acids may be replaced by other ions such as alkali metal ions derived from the raw materials.

In an embodiment of the Prussian blue analogues of the present invention, examples of the transition metal salts of hexacyanoferric (II) acid include the scandium (Sc) salt, the titanium (Ti) salt, the vanadium (V) salt, the chromium (Cr) salt, the manganese (Mn) salt, the iron (Fe) salt, the cobalt (Co) salt, the nickel (Ni) salt, the copper (Cu) salt and the zinc (Zn) salt of the acid, with the iron (Fe) salt, the cobalt (Co) salt, the nickel (Ni) salt, the copper (Cu) salt and the zinc (Zn) salt of hexacyanoferric (II) acid being preferable, and the iron (Fe) salt, in particular the ferric iron (Fe (III)) salt of the acid being more preferable. The transition metal salts of hexacyanoferric (II) acid in the present invention are not limited as long as the compounds are obtained by the reaction between an inorganic salt of hexacyanoferric (II) acid and an inorganic compound containing a transition metal element and as long as the compounds include the compounds of the above general formula (in which $M^B$ is in particular ferrous iron (Fe (II)). In such transition metal salts, part of the metal ions may be replaced by other ions such as alkali metal ions derived from the raw materials.

The ferric iron (Fe (III)) salt of hexacyanoferric (II) acid, which is the most preferred Prussian blue analogue in the present invention, is an old pigment also called Prussian blue or ultramarine blue. The ideal chemical composition thereof is Fe (III)$_4$[Fe (II)(CN)$_6$]$_3$.xH$_2$O (x=14 to 16) (namely, "iron (III) hexacyanoferrate (II) hydrate"), but part of the iron ions are replaced by other ions depending on factors such as the production process. Prussian blue in the present invention is not limited as long as the compound is obtained by the reaction between an inorganic salt of hexacyanoferric (II) acid and an inorganic compound containing iron (III) and as long as Prussian blue includes the compound having the above chemical composition. In the transition metal salt, part of the iron ions may be replaced by other ions such as alkali metal ions derived from the raw materials.

The inorganic salts of hexacyano metallic acids used in the present invention are not particularly limited as long as the salts are soluble in water and can form the Prussian blue analogues (namely, the transition metal salts of hexacyano metallic acids) of the present invention by the reaction with inorganic compounds containing a transition metal element. Examples thereof include alkali metal salts (such as sodium salts and potassium salts) of hexacyano metallic acids, and hydrates thereof. Specific examples include alkali metal salts (such as sodium salts and potassium salts) of hexacyanochromic (III) acid, hexacyanomanganese (II) acid, hexacyanoferric (II) acid and hexacyanocobalt (III) acid, and hydrates thereof.

When the hexacyano metallic acid is hexacyanoferric (II) acid as an example, the inorganic salts of hexacyanoferric (II) acid used in the present invention are not particularly limited as long as the salts are soluble in water and can form transition metal salts of hexacyanoferric (II) acid by the reaction with inorganic compounds containing a transition metal element. Specific examples include potassium hexacyanoferrate (II), sodium hexacyanoferrate (II) and hydrates thereof. It is preferable to use potassium hexacyanoferrate (II) or a hydrate thereof.

The inorganic compounds containing a transition metal element which are used in the present invention are not particularly limited as long as the compounds are soluble in water and can form the Prussian blue analogues (namely, the transition metal salts of hexacyano metallic acids) of the present invention by the reaction with the inorganic salts of hexacyano metallic acids. Examples of the inorganic compounds containing a transition metal element include halides, nitrates, sulfates and perchlorates of the first transition metals as well as hydrates of such compounds. Specific examples include halides such as iron (III) chloride, cobalt (II) chloride and nickel (II) chloride; nitrates such as iron (III) nitrate, cobalt (II) nitrate and nickel (II) nitrate; sulfates such as iron (III) sulfate and cobalt (II) sulfate; perchlorates such as iron (III) perchlorate; and hydrates of these compounds.

For example, the inorganic compounds containing iron (III) which are used in the present invention are not particularly limited as long as the compounds are soluble in water and can form Prussian blue by the reaction with the inorganic salts of hexacyanoferric (II) acid. Examples thereof include iron (III) chloride, iron (III) nitrate, iron (III) sulfate, iron (III) perchlorate and hydrates of these compounds.

[Hydrophilic Fiber Substrates]

The substrates in the cesium adsorbents of the present invention are hydrophilic fiber substrates. The hydrophilic fibers in the present invention may be translated into water-absorbing fibers. The hydrophilic fibers are a general term for fibers which easily take water molecules therein. Examples thereof include natural fibers such as wool, cotton, silk, hemp and pulp, and regenerated cellulose fibers such as rayon, polynosic fibers, cupra (BEMBERG®) and lyocell (TENCEL®). Further, modified hydrophilic fibers may be used. That is, hydrophilicity may be imparted to semisynthetic fibers such as acetates and triacetates or synthetic fibers such as polyamide fibers, polyvinyl alcohol fibers, polyvinylidene chloride fibers, polyvinyl chloride fibers, polyester fibers, polyacrylonitrile fibers, polyolefin fibers and polyurethane fibers according to known methods. In terms of cost and availability, preferred hydrophilic fibers are natural fibers or regenerated cellulose fibers, in particular, cotton, rayon or cupra.

The hydrophilic fiber substrate may be a woven, knitted or nonwoven fabric article including the hydrophilic fibers, or a paper article. The substrate may be processed into any shape which is appropriately selected in accordance with the aimed application, namely, the object to be decontaminated. In the case of the decontamination of water as an example, the substrate may be in the form of pellets or filters. The substrate may be a sheet or the like which can cover a wide range when soil is the target of decontamination. The substrate may be processed into such shapes before the Prussian blue analogue is supported on the substrate. In the cesium adsorbent of the present invention, however, the processing may take place after the supporting because the Prussian blue analogue is immobilized stably in the inside and on the surface of the fibers as will be described below.

[Cesium Adsorbents]

The cesium adsorbent of the present invention includes the hydrophilic fiber substrate on which the Prussian blue analogue, particularly preferably Prussian blue, is supported. The cesium adsorbent of the present invention is characterized in that the Prussian blue analogue is immobilized not only on the surface of the fibers but also in the inside of the fibers. In particular, "pigments" such as Prussian blue are insoluble in media such as water and organic solvents and do not exhibit dyeing properties with respect to substrates. Thus, dyeing (printing) of a fiber substrate with a pigment usually requires a post-treatment with a binder resin or the like so as to immobilize the pigment that has been attached to the surface of the fibers. In contrast, the Prussian blue analogue in the cesium adsorbent of the present invention is stably immobilized to the fibers without the help of a binder resin or the like because the Prussian blue analogue is formed in situ as fine particles present on the surface and in the inside of the fibers.

[Cesium Removal Devices]

While the cesium adsorbent of the present invention may be used by itself for the removal of radioactive cesium as will be described later, the cesium adsorbent may be incorporated into a cesium removal device. Thus, the present invention is also directed to a cesium removal device including the cesium adsorbent of the present invention. Examples of such cesium removal devices include filtration devices and wiper sheets having the cesium adsorbent of the present invention as a cesium adsorbing layer. The Prussian blue analogues can be generally decomposed by acid components such as hypochlorous acid. Therefore, if the decontamination is carried out by using tap water, it is preferable to bring such water into contact with an activated carbon layer capable of adsorbing and removing acid components such as hypochlorous acid before such water is brought into contact with the cesium adsorbent of the present invention. Thus, the cesium removal device preferably includes an activated carbon layer adjacent to the cesium adsorbent. Examples of such devices include filtration devices which include an activated carbon layer directly or indirectly adjacent to the cesium adsorbing layer composed of the cesium adsorbent of the present invention, and wiper sheets which include activated carbon sheets directly or indirectly interposing the cesium adsorbent (sheet) of the present invention therebetween.

[Cesium Adsorbent Production Methods]

To support the Prussian blue analogue to the hydrophilic fiber substrate, the cesium adsorbent of the present invention may be fabricated by a production method including the following steps:

(a) a step of treating the substrate including the hydrophilic fibers with an aqueous solution of an inorganic salt of a hexacyano metallic acid; and (b) a step of treating the substrate treated in the step (a) with an aqueous solution of an inorganic compound containing a transition metal element.

In the production method of the present invention, it is necessary that the hydrophilic fiber substrate be first treated with an aqueous solution of an inorganic salt of a hexacyano metallic acid. The present inventors have found that the precedence of the treatment in the step (a) allows for efficient formation of fine Prussian blue analogue particles on the surface and in the inside of the fibers.

In the treatment step (a), the concentration of the aqueous solution of an inorganic salt of a hexacyano metallic acid may be selected appropriately in accordance with factors such as the water solubility of the inorganic salt of a hexacyano metallic acid used, the type of the hydrophilic fibers, the weight/volume of the substrate, and/or the desired amount of the Prussian blue analogue to be supported to the substrate. For example, the concentration may be selected in the range of 0.001 to 0.1M, in particular in the range of 0.01 to 0.05 M. Similarly, the concentration of the aqueous solution of an inorganic compound containing a transition metal element in the treatment step (b) may be selected appropriately in accordance with factors such as the water solubility of the inorganic compound containing a transition metal element that is used, the concentration of the aqueous solution of the inorganic salt of a hexacyano metallic acid, the type of the hydrophilic fibers, the weight/volume of the substrate, and/or the desired amount of the Prussian blue analogue to be supported to the substrate. For example, the concentration may be selected in the range of 0.001 to 0.5 M, in particular in the range of 0.01 to 0.2 M.

The treatment step (a) may include a step (a1) of impregnating the hydrophilic fiber substrate with the aqueous solution of an inorganic salt of a hexacyano metallic acid; and a step (a2) of drying the impregnated substrate. For example, the step (a1) may be performed by soaking the hydrophilic fiber substrate in the aqueous solution of an inorganic salt of a hexacyano metallic acid. The soaking temperature and time are not particularly limited and may be determined appropriately in accordance with factors such as the type of the hydrophilic fibers, the weight/volume of the substrate, and/or the concentration of the aqueous solution. For example, the treatment may be carried out at about 10 to 40° C., and preferably ambient temperature, for about 1 minute to 48 hours, preferably 1 hour to 24 hours, and more preferably 6 to 12 hours. Where necessary, the substrate may be ultrasonicated during soaking. The temperature and time of the ultrasonic treatment are not particularly limited and may be determined appropriately in the similar manner as above. For example, the ultrasonication may be performed at about 10 to 40° C., and preferably ambient temperature, for about 1 minute to 2 hours, and preferably 5 minutes to 1 hour.

For example, the step (a2) may be performed by drying the hydrophilic fiber substrate taken out from the aqueous solution to remove water. The drying conditions are not particularly limited. In an embodiment, a large portion of water may be removed by manual squeezing or a mechanical dehydration operation as required and thereafter the substrate may be dried, for example, at about 10 to 100° C., and preferably about 20 to 60° C., optionally under reduced pressure, for about 30 minutes to 48 hours, and preferably about 1 to 24 hours. Most preferably, the substrate may be dried naturally at room temperature.

Alternatively, the treatment step (a) may include a step (a1) of impregnating the hydrophilic fiber substrate with the aqueous solution of an inorganic salt of a hexacyano metallic acid; and a step (a2') of washing the impregnated substrate with water, a polar organic solvent or a mixture thereof. The step (a1) is similar as described above. For example, the step (a2') may be performed by washing the hydrophilic fiber substrate taken out from the aqueous solution with water, a polar organic solvent or a mixture thereof. The washing conditions are not particularly limited. For example, the hydrophilic fiber substrate treated in the step (a1) may be soaked and swayed in water, a polar organic solvent or a mixture thereof. The polar organic solvents used in the washing are not particularly limited as long as the solvents are miscible with water in any ratio. Examples include water-soluble alcohols, for example, alcohols having 1 to 4 carbon atoms such as methanol, ethanol, 1-propanol, isopropanol and 1-butanol, as well as modified (industrial) ethanol; ethers such as tetrahydrofuran and 1,4-dioxane; amides such as N,N-dimethylformamide and N-methyl-2-pyrrolidone; lower ketones such as acetone; and acetonitrile. Preferred solvents are water-soluble alcohols such as ethanol, modified (industrial) ethanol and isopropanol, and mixtures of water and water-soluble alcohols.

The treatment step (b) may include a step (b1) of impregnating the substrate treated in the step (a) with the aqueous solution of an inorganic compound containing a transition metal element; and a step (b2) of drying the impregnated substrate. For example, the step (b1) may be performed by soaking the substrate treated in the step (a) in the aqueous solution of an inorganic compound containing a transition metal element. The soaking temperature and time are not particularly limited and may be determined appropriately in accordance with factors such as the type of the hydrophilic fibers, the weight/volume of the substrate, and/or the concentration of the aqueous solution. For example, the treatment may be carried out at about 10 to 40° C., and preferably ambient temperature, for about 30 seconds to 24 hours, preferably 1 minute to 1 hour, and more preferably 1 minute to 15 minutes. However, the soaking temperature and time may be easily controlled based on visual observation because as the reaction proceeds between the hexacyano metallic iron (II) acid and the transition metal during soaking, the Prussian blue analogue, namely, the transition metal salt of the hexacyano metallic acid is formed in situ with the result that the hydrophilic fiber substrate is dyed in a color originating from the transition metal (for example, blue in the case of iron (III)). After the soaking, the substrate is rinsed, preferably with water. The excess inorganic compound containing the transition metal element as well as the transition metal salt of the hexacyano metallic acid which has not become attached to the fibers may be removed by continuing rinsing until the rinsing liquid becomes transparent. Ultrasonication may be performed during the rinsing.

For example, the step (b2) may be performed by drying the hydrophilic fiber substrate taken out from the aqueous solution or the rinsing liquid to remove water. The drying conditions are not particularly limited. In an embodiment, a large portion of water may be removed by manual squeezing or a mechanical dehydration operation as required and thereafter the substrate may be dried, for example, at about 10 to 100° C., and preferably about 20 to 60° C., optionally under reduced pressure, for about 30 minutes to 48 hours, and preferably about 1 to 24 hours. Most preferably, the substrate may be dried naturally at room temperature.

[Radioactive Cesium Removal Methods]

The cesium adsorbent of the present invention may be used for the removal of radioactive cesium from objects, in particular, water and/or soil, contaminated with radioactive cesium. Thus, the present invention also provides a method for removing radioactive cesium using the cesium adsorbent of the present invention. For example, the method includes a step of bringing an object (in particular, water and/or soil) contaminated with radioactive cesium into contact with the cesium adsorbent of the present invention described above, and a step of recovering the adsorbent. Preferably, the cesium adsorbent of the present invention is used after being subjected to an ultrasonication in water. The ultrasonic treatment probably facilitates the migration of radioactive cesium to the Prussian blue analogue immobilized in the inside of the fibers when the cesium adsorbent of the present invention is brought into contact with the contaminated water and/or soil. In the use for the removal of radioactive cesium from soil, it is preferable that the surface of soil and/or the cesium adsorbent of the present invention be wet with water. The water probably promotes the migration of radioactive cesium from the soil into the adsorbent, thus enhancing the removal efficiency.

The cesium removal device of the present invention may be used for the removal of radioactive cesium from objects contaminated with radioactive cesium. Thus, the present invention also provides a method for removing radioactive cesium using the cesium removal device of the present invention. For example, the method includes a step of treating an object (in particular, water and/or soil) contaminated with radioactive cesium with the cesium removal device of the present invention described above, and a step of recovering the adsorbent from the removal device. In an example, when the cesium removal device of the present invention is a filtration device including the cesium adsorbent of the present invention as a cesium adsorbing layer, the method includes a step of filtering the contaminated water and a step of recovering the cesium adsorbent from the filtration device. In another example, when the cesium removal device of the present invention is a wiper sheet which includes activated carbon sheets interposing the cesium adsorbent (sheet) of the present invention therebetween, the method includes a step of wiping the surface of an object contaminated with radioactive cesium with the wiper sheet which has been wet with water, and a step of recovering the cesium adsorbent from the wiper sheet.

EXAMPLES

Hereinbelow, specific embodiments of the present invention will be described as examples. However, these embodiments are only illustrative and do not intend to limit the scope of the present invention.

Fabrication Example 1

Fabrication of Cesium Adsorbent

[Procedures]

(1) A fiber substrate (cotton 100%: towel cloth) which was cut out into a 1 cm square was soaked in a 0.016 M aqueous potassium hexacyanoferrate (II) solution (10 mL) and was sufficiently impregnated therewith.

(2) After being ultrasonicated for 5 minutes, the substrate was dried in a vacuum heating dryer overnight at 50° C.

(3) The substrate was placed into a 0.11M $FeCl_3$ solution (10 mL) and was allowed to stand for about 5 minutes. After the confirmation that the entire cloth had been thoroughly soaked in the solution and both sides had become blue, the substrate was taken out and the extra water was removed with KimWipe. The substrate was then transferred into a test tube.

(4) The substrate was rinsed with 1 mL of pure water five times. Thereafter, an ultrasonication was performed in pure water for about 25 minutes, but the rinsing liquid remained apparently transparent.

(5) The substrate was dried by being heated at 50° C. at a reduced pressure.

[Results]

The color of the obtained fiber substrate was deep blue specific to Prussian blue.

Fabrication Example 2

Fabrication of Cesium Adsorbent

[Procedures]

The procedures were carried out in accordance with Example 1, except that the steps (2) and (4) in [Procedures] of Fabrication Example 1 were interchanged.

[Results]

The color of the obtained fiber substrate was yellowish blue compared to the substrate obtained in Fabrication Example 1, and was green as a whole. This was probably because the amount of formed Prussian blue was small and blue color was mixed with yellow color of the iron chloride that had become attached to the fibers together with Prussian blue.

Fabrication Example 3

Fabrication of Cesium Adsorbent

[Procedures]

(1) A fiber substrate (cotton 100%: towel cloth: approximately 30 cm×30 cm) was soaked in a 0.0156 M aqueous potassium hexacyanoferrate (II) solution (150 mL) and was sufficiently impregnated therewith.

(2) The substrate was squeezed and was naturally dried at room temperature.

(3) The dried towel was placed into a 0.023 M aqueous iron (III) chloride solution (250 mL) and was thoroughly impregnated therewith.

(4) The substrate was rinsed with pure water several times.

(5) The substrate was squeezed and was naturally dried at room temperature.

[Results]

The color of the obtained fiber substrate was deep blue specific to Prussian blue.

Fabrication Example 4

Fabrication of Cesium Adsorbent

[Procedures]

(1) A fiber substrate (cotton 100%: towel cloth: approximately 30 cm×70 cm) was soaked in a 0.05 M aqueous potassium hexacyanoferrate (II) solution (500 mL) for 24 hours.

(2) The substrate was washed with 200 mL of ethanol two times.

(3) The substrate was placed into a 0.05 M $FeCl_3$ solution (500 mL) and was taken out 1 minute later.

(4) The substrate was rinsed with 400 mL of pure water three times.

(5) The fiber substrate was air dried at room temperature.

[Results]

The color of the obtained fiber substrate was deep blue specific to Prussian blue. The proportion of Prussian blue supported was estimated to be about 2% based on the weight difference.

Fabrication Example 5

Fabrication of Cesium Adsorbent

[Procedures]

(1) A fiber substrate (regenerated cellulose white cloth (68 g/m$^2$): approximately 30 cm×100 cm) was soaked in a 0.05 M aqueous potassium hexacyanoferrate (II) solution (500 mL) for 24 hours.

(2) The substrate was washed with 200 mL of ethanol two times.

(3) The substrate was placed into a 0.05 M $FeCl_3$ solution (500 mL) and was taken out 1 minute later.

(4) The substrate was placed into 400 mL of pure water and was ultrasonicated for 3 minutes. This treatment was repeated three times.

(5) The fiber substrate was air dried at room temperature.

[Results]

The color of the obtained fiber substrate was deep blue specific to Prussian blue. The proportion of Prussian blue supported was estimated to be about 2% based on the weight difference.

Adsorption Experiment Example 1

Cesium Adsorption Ability Measurement Experiment

[Procedures]

(1) A fiber piece sample (ultrasonicated in pure water (about 15 minutes)) was placed into a 10 ppm cesium solution (50 mL, for example, the 10 ppm cesium solution was prepared as a 75 μM aqueous cesium chloride solution or aqueous cesium perchlorate solution) and was allowed to stand for 24 hours to give a sample solution.

(2) The cesium count rate in each of the sample solutions was measured by ICP-MS (inductively coupled plasma emission mass spectrometry: SPQ9000 manufactured by Seiko Instruments Inc.). A primary calibration curve was drawn using the count rate values of a standard sample of known concentration (the cesium solution before the addition of the fiber piece sample) and a blank sample (Milli-Q water), and the concentrations of the samples were determined. Based on the measured concentrations, the initial concentration was divided to calculate the removal rates.

[Experiment Results]

TABLE 1

| Sample name | Sample weight (mg) | Concentration (ppm) | Amount of solution (mL) | Removal rate (%) |
| --- | --- | --- | --- | --- |
| PT-04* | 26 | 10 | 50 | 35 |
| PT-04* | 25 | 10 | 50 | 34 |
| PT-04* | 26 | 10 | 50 | 25 |
| control* | 25 | 10 | 50 | 0 |

*Names and details of samples
Control: Fiber substrate without any supporting.
PT-04: Cesium adsorbent obtained in Fabrication Example 3 (Samples cut out into 1 cm × 1 cm were used in respective measurements).

Demonstration Experiment 1: Decontamination of water

The cesium adsorbent (sheet: 23 g) obtained in Fabrication Example 5 was placed into 1 L of low-concentration contaminated water (20 Bq/L: measured with NaI(T1) scintillator (ATOMTECH AT1320A)) sampled from a gutter of a house in a caution zone in Fukushima prefecture. After 10 hours, the cesium adsorbent was recovered. The dose of radiation from the treated water was below the detection limit (8 Bq).

Demonstration Experiment 2: Decontamination of soil

1 L of a fertilizer solution (an aqueous solution containing about 100 g of potassium dihydrogenphosphate and about 100 g of ammonium sulfate) was added to 0.1 kg of contaminated soil (about 30,000 Bq/kg: measured with NaI(Tl) scintillator (ATOMTECH AT1320A)) sampled in a caution zone in Fukushima prefecture. After heating, the supernatant liquid was separated from the soil and the soil was washed with water, thereby removing about 70% of radioactive cesium from the contaminated soil. The cesium adsorbent (sheet: 30 g) obtained in Fabrication Example 5 was placed into 1 L of a portion of contaminated water (250

Bq/kg) that was a mixture of the supernatant liquid and the washing liquid. After 19 hours, the cesium adsorbent was recovered. The dose of radiation from the treated supernatant liquid was reduced by 70%. Thus, it has been demonstrated that the cesium adsorbent of the present invention can selectively adsorb cesium ions present in a trace amount in water containing competitive ions (such as potassium and ammonium) in very high concentrations.

INDUSTRIAL APPLICABILITY

The cesium adsorbents of the present invention which include the hydrophilic fiber substrate supporting the Prussian blue analogue exhibit excellent cesium-adsorbing ability, and are safe and easy to handle. The adsorbents of the present invention may be obtained from inexpensive and easily available materials by a simple production method, thus realizing excellent applicability to a wide range of environmental purification from an economical aspect. In particular, the excellent formability of the hydrophilic fiber substrates advantageously allows the cesium adsorbents to be readily processed into a configuration best suited for the object to be decontaminated. After the adsorption of radioactive cesium in the environment, the adsorbents of the present invention can be recovered easily without leaving the Prussian blue analogues (to which cesium has been adsorbed) in the environment. Thus, the amounts of radioactive wastes may be suppressed as compared to the physical decontamination by removing the surface soil. Further, the cesium adsorbents of the present invention do not require any special equipment or knowledge for the handling thereof, and thus expectations arise for the adsorbents to be used to realize the establishment and the application of compact and distributed systems for the decontamination from radioactive substances.

The invention claimed is:

1. A cesium adsorbent comprising a hydrophilic fiber substrate supporting a transition metal salt of hexacyano metallic acid, wherein the transition metal salt of hexacyano metallic acid is immobilized in the inside of fibers included in the hydrophilic fiber substrate.

2. The cesium adsorbent according to claim 1, wherein the transition metal salt of hexacyano metallic acid is Prussian blue.

3. The cesium adsorbent according to claim 1, wherein the hydrophilic fiber substrate is a woven, knitted or nonwoven fabric article comprising hydrophilic fibers, or a paper article.

4. The cesium adsorbent according to claim 1, wherein the hydrophilic fiber substrate is a woven, knitted or nonwoven fabric article comprising natural fibers or regenerated cellulose fibers.

5. The cesium adsorbent according to claim 1, wherein the hydrophilic fiber substrate is a woven, knitted or nonwoven fabric article comprising cotton, rayon or cupra.

6. The cesium adsorbent according to claim 2, wherein the hydrophilic fiber substrate is a woven, knitted or nonwoven fabric article comprising hydrophilic fibers, or a paper article.

7. The cesium adsorbent according to claim 2, wherein the hydrophilic fiber substrate is a woven, knitted or nonwoven fabric article comprising natural fibers or regenerated cellulose fibers.

8. The cesium adsorbent according to claim 3, wherein the hydrophilic fiber substrate is a woven, knitted or nonwoven fabric article comprising natural fibers or regenerated cellulose fibers.

9. The cesium adsorbent according to claim 2, wherein the hydrophilic fiber substrate is a woven, knitted or nonwoven fabric article comprising cotton, rayon or cupra.

10. The cesium adsorbent according to claim 3, wherein the hydrophilic fiber substrate is a woven, knitted or nonwoven fabric article comprising cotton, rayon or cupra.

11. A method for removing radioactive cesium from a contaminated object, comprising a step of bringing the object contaminated with radioactive cesium into contact with the cesium adsorbent described in claim 1, and a step of recovering the adsorbent.

12. A cesium removal device comprising the cesium adsorbent described in claim 1.

13. The cesium removal device according to claim 12, comprising an activated carbon layer adjacent to the cesium adsorbent.

14. A method for removing radioactive cesium from a contaminated object, comprising a step of treating the object contaminated with radioactive cesium with the cesium removal device described in claim 12, and a step of recovering the cesium adsorbent from the removal device.

15. A production method for producing the cesium adsorbent described in claim 1, comprising:
(a) a step of treating a hydrophilic fiber substrate with an aqueous solution of an inorganic salt of a hexacyano metallic acid; and
(b) a step of treating the substrate treated in the step (a) with an aqueous solution of an inorganic compound containing a transition metal element.

16. The production method according to claim 15, wherein the inorganic salt of a hexacyano metallic add in the step (a) is potassium or sodium hexacyanoferrate (II).

17. The production method according to claim 15, wherein the inorganic compound containing a transition metal element in the step (b) is an inorganic compound containing iron (III).

18. The production method according to claim 17, wherein the inorganic compound containing iron (III) is iron (III) chloride, iron (III) nitrate, iron (III) sulfate or iron (III) perchlorate.

19. The production method according to claim 15, wherein the step (a) comprises a step of impregnating the hydrophilic fiber substrate with the aqueous solution of an inorganic salt of a hexacyano metallic acid; and a step of washing the impregnated substrate with water, a polar organic solvent or a mixture thereof.

20. The production method according to claim 15, wherein the step (b) comprises a step of impregnating the substrate treated in the step (a) with the aqueous solution of an inorganic compound containing a transition metal element; and a step of drying the impregnated substrate.

* * * * *